May 28, 1963 H. STATZ 3,091,701

HIGH FREQUENCY RESPONSE TRANSISTORS

Filed March 26, 1956 2 Sheets-Sheet 1

INVENTOR
HERMANN STATZ
BY Elmer J. Gorn
ATTORNEY

HIGH FREQUENCY RESPONSE TRANSISTORS

Filed March 26, 1956 2 Sheets-Sheet 2

INVENTOR
HERMANN STATZ
BY Elmer J. Gorn
ATTORNEY 3,091,701
Patented May 28, 1963

3,091,701

HIGH FREQUENCY RESPONSE TRANSISTORS

Hermann Statz, Waltham, Mass., assignor to Raytheon Company, Lexington, Mass., a corporation of Delaware Filed Mar. 26, 1956, Ser. No. 573,842
5 Claims. (Cl. 307—88.5)

This invention relates generally to semiconductive signal-translation devices, and more particularly to such devices of the class now known as transistors.

Recent years have witnessed the discovery and development of a new type of electrical translation device comprising a body of semiconductive material, as for example, germanium or silicon, which is provided with adjacent zones or regions exhibiting different electrical conductivity characteristics. The adjacent zones each contains traces of impurity material from either the third or fifth groups of the periodic table of elements according to Mendelyeev, which materials gives rise to what is known as P-type conduction in the case of the inclusion of an impurity material from the third group, or N-type conduction in the case of the inclusion of an impurity material selected from the aforementioned fifth group. A zone is thus called a P or an N zone depending upon the predominance of the impurity material it contains, and the interface between two opposite type zones is designated as a P-N (N-P) junction.

Devices of this class in which a single zone of one conductivity type material, as for example N-type, is positioned intermediate two zones of opposite conductivity type material, such as P-type, are known as PNP transistors. The two outer zones are respectively provided with a conducting electrode designated as emitter and collector, while the intermediate zone has an electrode designated as the base electrode in contact therewith. These devices, when provided with proper biasing voltages, are capable of performing amplifying, rectifying, and in some cases, oscillating functions, and have already found their place in audio-frequency circuits and relatively low radio-frequency circuits. However, at the higher frequencies their use has been seriously restricted due to the poor frequency response exhibited in this region.

Accordingly, the present invention is directed toward novel transistor structures, and circuit arrangements, wherein a potential gradient substantially in excess of the chemical potential gradient, a term which will hereinafter be defined, is created throughout the entire region between emitter and collector, thereby increasing the velocity of the flow of current carriers between emitter and collector, and thus greatly increasing the frequency response of the transistor. To accomplish this end, a general embodiment of the present invention provides a body of semiconductive material having an emitter region, a base region, and a collector region which is of the kind that produces a multiplication of current carriers in the region of the reverse biased junction between the collector and base regions. Some of the multiplied majority carriers are made to flow back across the base region to a base electrode which is arranged to cause this flow to be essentially parallel to the minority carrier current flow between emitter and collector. The back flow of majority carriers produces an electrostatic potential gradient across the base zone of a polarity which superimposes a substantial drift velocity on the diffusion motion of the minority carriers emitted into the base region by the emitter, thus rapidly sweeping the minority carriers to the collector. Since the greatest restriction on the frequency response of a junction transistor results from the relatively slow diffusion of minority carriers through the base region, the internal field thus created by the present structure markedly reduces the transit time of the minority carriers, and considerably increases the frequency response characteristics.

The invention will be better understood as the following description proceeds taken in conjunction with the accompanying drawings wherein.

Figures 1, 2:
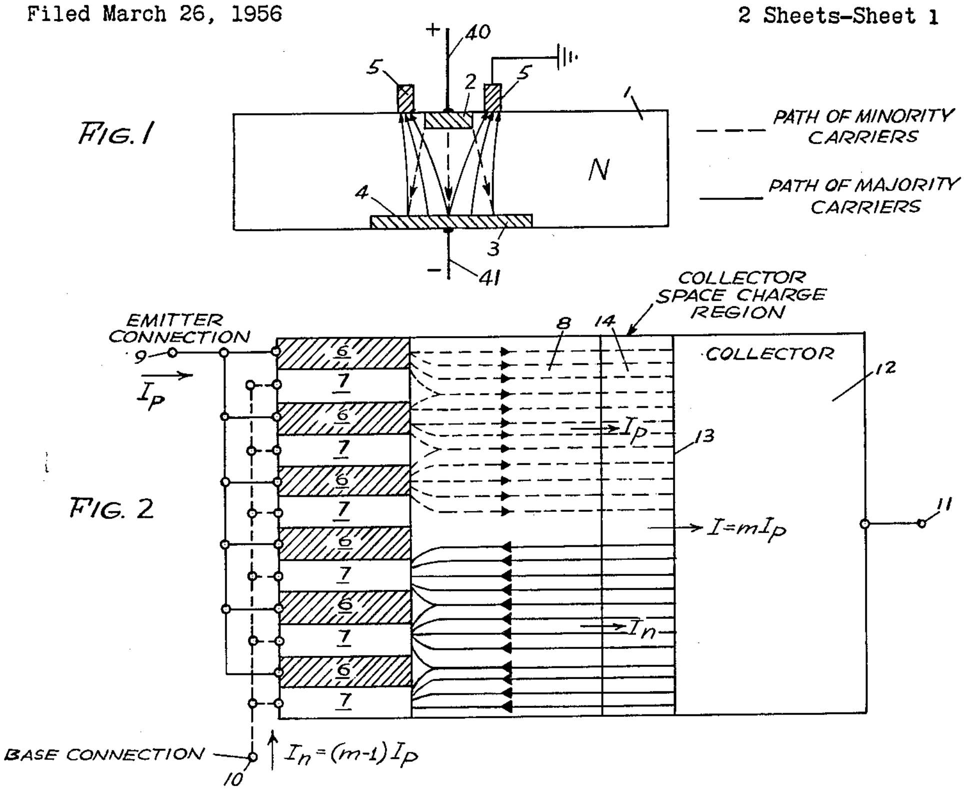
FIG. 1 is a diagrammatic representation of a transistor structure embodying the principles of the present invention.
FIG. 2 is a diagrammatic representation of another transistor structure embodying the principles of the present invention.

The magnitude of the current in a given region of a semiconductor body may be shown to be attributable to two distinct components, viz., a portion due to the flow of holes, and a portion due to the flow of electrons. These components may further be represented by the following equations:

$$(1a) \qquad \vec{j}_p = q\mu_p p\vec{E} - qD_p \overrightarrow{\nabla p}$$

and $$(2a) \qquad \vec{j}_n = q\mu_n n\vec{E} + qD_n \overrightarrow{\nabla n}$$

where the arrow above the terms $j_p$, $j_n$, E, $\nabla p$, and $\nabla n$ indicates that they are vector quantities.

In the above equations the quantities $\vec{j}_p$ and $\vec{j}_n$ represent the hole current density and the electron current density, respectively, in amps/cm.$^2$; $\mu_p$ and $\mu_n$ are, respectively, the mobility of a hole and the mobility of an electron in cm.$^2$/volt-sec.; $q$ is the absolute value of the electronic charge, i.e., $1.60\times10^{-19}$ coulomb; $p$ and $n$ are, respectively, the hole and electron densities in cm.$^{-3}$ at any arbitrary point and time; $D_p$ and $D_n$ are, respectively, the diffusion coefficients of holes and electrons in cm.$^2$/sec.; $\vec{E}$ is the electric field in volts/cm.; and $\vec{\nabla}$ is the gradient operator in cm.$^{-1}$.

By substitution of the Nernst-Einstein relationship $$(2) \qquad D=\mu kT/q$$

into Equations $1a$ and $1b$, where D, $\mu$, and $q$ have their previously defined meanings, $k$ is Boltzmann's constant ($1.38\times10^{-23}$ joule/°K.), and T is the absolute temperature in degrees Kelvin, we eliminate $D_p$ and $D_n$ from Equations $1a$ and $1b$, respectively, and obtain:

$$(3a) \qquad \vec{j}_p = q\mu_p\left[p\vec{E} - \left(\frac{kT}{q}\right)\nabla p\right]$$

and $$(3b) \qquad \vec{j}_n = q\mu_n\left[n\vec{E} + \left(\frac{kT}{q}\right)\overrightarrow{\nabla n}\right]$$

The expressions for hole and electron current densities may also be written in the form $$(4a) \qquad \vec{j}_p = -q\mu_p p \nabla \phi_p$$

and $$(4b) \qquad \vec{j}_n = -q\mu_n n \nabla \phi_n$$

where $q$, $\mu_p$, $p$ and $\vec{\nabla}$ have their previous meanings, and $\phi_p$ and $\phi_n$ are, respectively, the potential of a hole and of an electron.

The gradients of $\phi_p$ and $\phi_n$ may further be written as $$\vec{\nabla}\phi_p = -\vec{E} + \left(\frac{kT}{q}\right)\frac{\nabla p}{p} \quad (5a)$$

and $$\vec{\nabla}\phi_n = -\vec{E} - \left(\frac{kT}{q}\right)\frac{\nabla n}{n} \quad (5b)$$

By differentiating Equations 5*a* and 5*b* with respect to $x$, the width across the base region, we obtain $$\frac{d\phi_p}{dx} = \frac{d\psi}{dx} + \left(\frac{kT}{q}\right)\frac{d\,(\ln p)}{dx} \quad (6a)$$

and $$\frac{d\phi_n}{dx} = \frac{d\psi}{dx} - \left(\frac{kT}{q}\right)\frac{d\,(\ln n)}{dx} \quad (6b)$$

were $\psi$ is defined as the electrostatic potential, and the remaining terms have their previous means.

Further analysis of Equations 6*a* and 6*b* may at this point be helpful in explaining the principles upon which the present inventive concept is based. As can be seen from Equation 6*a*, the potential gradient across the base region of previously known transistor structures wherein the minority carriers are "holes," is composed of the two terms $$\frac{d\psi}{dx} \text{ and } \left[\left(\frac{kT}{q}\right)\frac{d\,(\ln p)}{dx}\right]$$

Similarly, as shown by Equation 6*b*, the potential gradient across the base region when the minority carriers are electrons is composed of the two terms $$\frac{d\psi}{dx} \text{ and } \left[\left(\frac{kT}{q}\right)\frac{d\,(\ln n)}{dx}\right]$$

In this specification and the claims annexed thereto, the term $$\frac{d\psi}{dx}$$

will be designated as the "electrostatic potential gradient," while the term $$\left[\left(\frac{kT}{q}\right)\frac{d\,(\ln A)}{dx}\right]$$

wherein A may be either the "hole" or electron density depending upon whether Equation 6*a* or 6*b* is being considered, will be designated as the "chemical potential gradient." Heretofore known transistors have relied for their operation primarily on the diffusion of current carriers across the base region from emitter to collector, the diffusion time across the base region being a function of the chemical potential gradient, and being defined as the average time in which an injected current carrier will travel across the base region from emitter to collector. The electrostatic potential term in such transistors is so small as to be insignificant, and since it thereby contributes practically nothing to the operation of these devices, it has usually been ignored by workers in the art. Thus, in present transistors in which the electrical charge in any region thereof is due substantially entirely to the chemical potential gradient, the small potential gradient thereby created in such a region is so low that it is unable to impose any substantial accelerating force on the current carriers as they diffuse through the region. The maximum potential gradient which can be created under such previously known conditions is a definite value for each given semiconductor body, and as previously discussed, is designated in this specification and the claims annexed hereto as the "chemical potential gradient."

If, however, conditions are changed so as to provide in such a region an additional potential gradient substantially in excess of the minute value of the chemical potential gradient, a substantial drift velocity is superimposed on the current carriers in addition to the diffusion motion, which greatly decreases the transit time of the carriers between emitter and collector. This can be accomplished in accordance with the present invention by increasing the electrostatic potential gradient to a point where it is substantially in excess of the minute chemical potential gradient, thereby increasing the overall potential gradient. The critical value occurs according to Equations 6*a* and 6*b* when the absolute value of the electrostatic potential gradient exceeds the value of the chemical potential gradient, i.e., when $$\left|\frac{d\psi}{dx}\right| > \left|\left(\frac{kT}{q}\right)\left(\frac{d\,(\ln p)}{dx}\right)\right|$$

for the instance where holes are the minority carriers, and when $$\left|\frac{d\psi}{dq}\right| > \left|\left(\frac{kT}{q}\right)\left(\frac{d\,(\ln n)}{dx}\right)\right|$$

for the instance where electrons are the minority carriers. One way in which such an increased potential gradient can be produced is to exhaust a region of its mobile carriers, which creates a substantial nonuniform population of uncompensated stationary charges opposite in sign to that of the majority carriers. This produces what is commonly called a space charge region in the semiconductor body. Another way in which such an increased potential gradient can be produced in a semiconductor region, is to create in that region a substantial flow of majority carriers in a direction opposite to the direction in which it is desired to cause the minority carriers to flow. Thus, it can be seen that, both in the space charge region and in the majority carrier flow region, a nonuniform uncompensated distribution of charges is created which produces the desired increased potential gradient.

Referring now to the drawings, and more particularly to FIG. 1 thereof there is shown a diagrammatic representation of a transistor structure embodying the present inventive concept. Numeral 1 designates a body of semiconducting material such as germanium or silicon, for example, which is provided with an emitter region 2, and a collector region 3. The main body of semiconductor 1 may be N-type, while emitter 2 and collector 3 may be P-type regions made by alloying a P-type impurity material into body 1 in accordance with principles well known in the art, thus forming a so-called PNP transistor. The structure may be completed by the suitable attachment of a base electrode 5, preferably in the form of a conducting ring encircling the emitter 2, the diameter of the emitter also preferably being smaller than the width of the base zone between emitter 2 and collector 3. Appropriate electrodes 40 and 41 may also be connected to the emitter 2 and collector 3 in order to provide conducting paths to biasing sources, and for external circuit connections.

Figure 4:
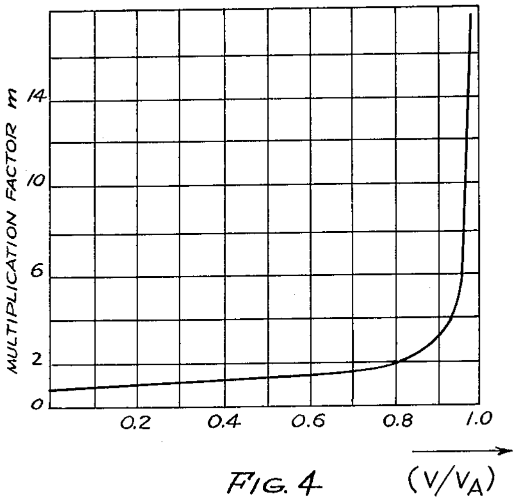

With the application of a reverse bias voltage to the collector 3, i.e. with the collector negative with respect to the base, a space-charge region of high electric field will be caused to exist at the junction 4 between the P-type collector 3 and the N-type base zone of the body 1. This space-charge region is voltage dependent, and therefore, will extend into the base zone for a distance dependent upon the magnitude of the voltage applied to the collector 3. It is also known that the saturation current in junction transistors increases rapidly independent of voltage after the junction voltage reaches a certain critical value. This phenomenon was formerly thought to be the Zener effect, i.e., the transition of electrons directly from the valence band to the conduction band under the influence of high electric fields. However, it has recently been discovered that the increase in current is not due to the Zener effect, but to an avalanche breakdown of the junction similar to the ionization process in gaseous discharge tubes. The ionization rate increases with the electric field strength in the junction, and therefore, with the junction voltage. This type of breakdown gives a multiplication of the current carriers within the region of high electric field strength. The voltage at which the junction actually breaks down is called the avalanche breakdown voltage, hereinafter termed $V_A$. FIG. 4 shows the multiplication factor, $m$, defined as the ratio of the actual junction current to the current that would flow if there were no ionization effects, plotted against the junction voltage V normalized to $V_A$. As can readily be seen, for low voltage ratios, $m$ is close to unity, i.e., no appreciable multiplication effect is present. However, with increasing junction voltage, the multiplication factor increases until at $V=V_A$ a true breakdown, called avalanche breakdown, occurs, with the multiplication factor increasing to high values only in the vicinity of the avalanche breakdown voltage $V_A$. It has been found that the avalanche breakdown voltage is dependent on the resistivity of the base zone in alloyed junction transistors and is substantially given by the formula $V_A \cong 80(\rho^{0.6})$ where $V_A$ is measured in volts, and $\rho$, the base region resistivity for N-type germanium, is measured in ohm-cm.

Figure 3:
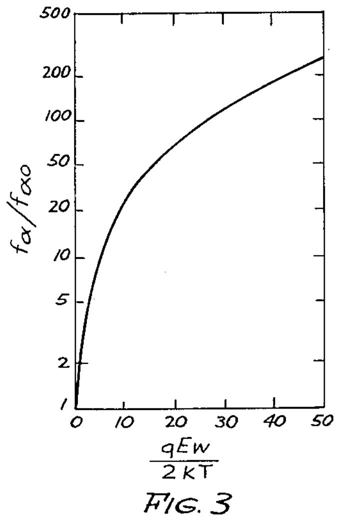
FIGS. 3 and 4 are graphs useful in explaining the invention.

As shown most clearly in FIG. 1, the present invention utilizes the above-described multiplication effect to provide a novel transistor structure having improved high frequency response characteristics. Numeral 1 designates a body of semiconductive material, as for example germanium or silicon, provided with an emitter region 2, and a collector region 3, the space between these zones forming the base region of the device. The body 1 may be of N-type material, while emitter 2 and collector 3 may be P-type regions as is well known in the art. With the emitter biased in the forward direction, i.e., with electrode 40 positive with respect to base contact 5, and with collector 3 biased in the reverse direction, i.e., with electrode 41 negative with respect to base contact 5, the emitter 2 will inject minority carriers into the base region of the semiconductor body 1. The minority carriers, in this case holes, will substantially follow a path across the base region indicated by the dotted lines in FIG. 1. Due to the high field in the region of junction 4 caused by operating the collector 3 at a voltage high enough to produce the desired multiplication effect at the collector, some of these holes will reach high enough energies in the region of the high field to excite electrons from the valence band to the conduction band, and thus produce hole-electron pairs. For each minority carrier arriving at collector 3, $(m-1)$ majority carriers, in this case electrons, leave the collector and flow to the base contact 5, $m$ being the multiplication factor of the junction. This back flow of majority carriers produces an electrostatic potential gradient across the base zone, essentially due to Ohm's law, of a polarity which will superimpose a substantial drift velocity on the diffusion motion of minority carriers being injected at the emitter 2. In accordance with the present invention, base contact 5 is positioned on semiconductive body 1 in such a manner as to cause the majority carrier flow to be essentially parallel to the minority carrier flow, thus causing the potential gradient to be most efficiently superimposed on the diffusion motion of minority carriers across the base zone. The increased speed with which the minority carriers travel due to the internal field will, therefore, considerably increase the cutoff frequency of the device, as shown by reference to FIG. 3, wherein the ratio of cutoff frequency with field, $f_\alpha$, to that without field, $f_{\alpha 0}$, is plotted versus the dimensionless quantity $$\frac{qEw}{2kT}$$

$q$ being the electronic charge in coulombs, E the electric field in volts/cm., $w$ the base width in cm., $k$ is Boltzmann's constant in joules/°K., and T is the absolute temperature in °K.

In FIG. 2 is shown an alternative type structure illustrating the principles of the present invention. In this embodiment, the emitter consists of a series of P-type regions 6 interspersed with a series of N-type base regions 7 formed by extensions of the primary N-type base region 8. Electrical connections 9, 10 and 11 may be, respectively, made to the emitter regions 6, base regions 7 and collector region 12. As previously described, the application of a voltage to collector connection 11 sufficiently close to the avalanche breakdown voltage of the transistor will cause a multiplication of carriers to occur at collector junction 13 in the region of space charge 14. The majority carriers thus formed travel back across base regions 8 and 7 to base connection 10, and produce a potential gradient which will aid the travel of minority carriers injected from emitter regions 6 across the base region to collector region 12. In FIG. 2, the paths of the minority and majority carriers have been separated for ease of illustration, it being understood that minority carriers travel in the lower half as well as the upper half and vice versa. $I_n$ and $I_p$ represent the electron and hole current flow in the device as distinguished from the flow of carriers indicated by the dotted and solid lines.

To optimize the increased frequency response thus obtained, it is desirable to have as large a potential gradient as possible and, at the same time, approach a one-dimensional device geometry. In addition, applicant has found that the gradient is further optimized by using extremely low doping levels of impurity material in the base region, a level of the order of $10^{14}$ atoms/cc. being successfully utilized, this value corresponding to a resistivity of about 15 ohm-cm. in N-type germanium.

Figure 5:
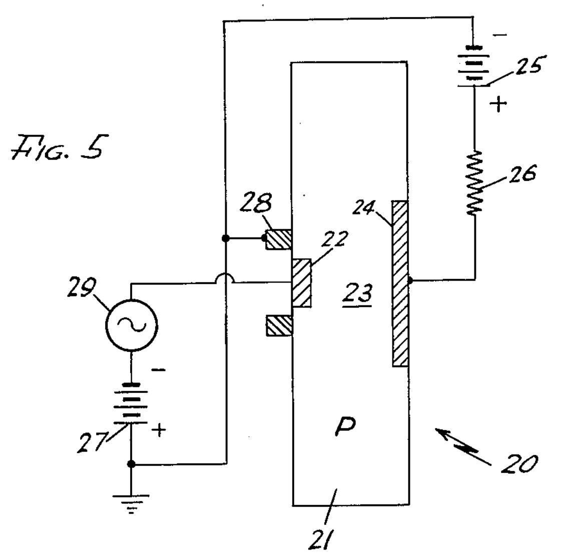
FIG. 5 is a partial schematic of a transistor in accordance with the present invention utilized as an amplifying device.

In FIG. 5 there is shown a circuit arrangement wherein a semiconductive device, in accordance with the present invention, may be incorporated to function as a signal amplifier. A transistor 20 comprising a semi-conductive body 21 having an emitter region 22, a base region 23, and a collector region 24 is provided with appropriate electrical connections to each region. Emitter region 22 and collector region 24 may be N-type, while base region 23 is P-type, thus forming a so-called NPN transistor. Collector 24 is provided with a reverse bias voltage of a magnitude sufficient to cause multiplication of carriers at the collector junction, i.e., in the range of about 0.1 $V_A$ to substantially the avalanche breakdown voltage $V_A$, by means of battery 25 having its positive terminal connected to collector 24 through load resistor 26. Emitter 22 is biased in the forward direction by battery 27. Base contact 28 may comprise a conductive ring and is grounded as shown. With the circuit arrangement of FIG. 5, the impression of a signal derived from a suitable source, such as generator 29, between emitter 22 and base contact 28, will result in an amplified replica of the signal appearing across load resistor 26. Due to the internal field created by the aforementioned multiplication process, the transit time of minority carriers across base region 23 will be reduced, and the frequency of the signal emanating from generator 29 which the device is capable of successfully amplifying before cutoff is considerably increased. It should be noted that although the transistor described in FIG. 5 is of the NPN type, a PNP type may equally well be used, the only change in the circuit being a reversal of the polarity of the biasing batteries 25 and 27.

Figure 6:
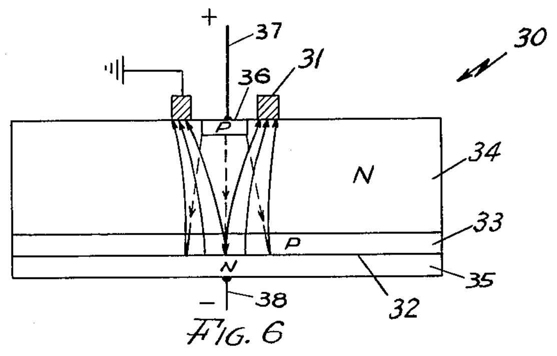
FIG. 6 is a diagrammatic representation of still another transistor structure embodying the principles of the present invention.

In practicing the present invention, it is not necessary that the multiplication of carriers be of the avalanche breakdown variety, as long as a multiplication effect be somehow provided. Accordingly, in FIG. 6 there is shown another embodiment wherein a PNPN or "hook" transistor 30 is provided with a base contact 31 oriented to constrain the flow of majority carriers thereto substantially parallel to the flow of injected minority carriers. In devices of this type, there is provided an emitter region 36, a base region 34 and a collector region consisting of the two N and P regions 33 and 35 including the P-N junction 32. Under proper biasing conditions of a polarity, as indicated in the drawings, a multiplication of carriers occurs at the junction 32. Some of the multiplied carriers diffuse across the narrow P region 33 and enter N region 34, whereupon they travel to base contact 31 creating a potential gradient across N region 34, in accordance with previously described principles, thus greatly increasing the frequency response of the device.

Although there have been described what are considered to be preferred embodiments of the present invention, various adaptations and modifications thereof may be made without departing from the spirit and scope of the invention as defined in the appended claims.

What is claimed is:

1. In combination, a semiconductive device having an emitter, a base, and a collector, said collector having a voltage source connected thereto of a magnitude adapted to produce a multiplication of current carriers arriving at it from said emitter, biasing means connected between said emitter and said base, a signal source connected to said emitter, and an output circuit connected to said collector, said device having its emitter contact positioned substantially in line with the path of a substantial number of said multiplied carriers as said multiplied carriers travel to a base contact attached to said base region so as to cause said multiplied carriers to travel substantially parallel and in opposing direction to carriers injected at said emitter whereby a substantial drift velocity is superimposed on the random diffusion motion of said injected carriers while said injected carriers are traversing across said base region from said emitter to said collector region thereby enabling a high frequency signal to be derived from said output circuit.

2. In combination, a semiconductive device having an emitter region, a base region, and a collector region, conducting electrodes attached respectively to each of said regions constituting an emitter electrode, a base electrode and a collector electrode, biasing means connected to said emitter and collector electrodes, the value of the bias voltage applied to said collector electrode being of sufficient magnitude to cause a multiplication of current carriers in the vicinity of said collector region, said base electrode being physically positioned substantially in line with the path traversed by minority current carriers leaving said emitter region and traveling to said collector region whereby the flow of multiplied majority carriers from said collector region to said base electrode creates an electrostatic potential gradient in a direction which aids the flow of said minority carriers from said emitter region to said collector region.

3. In combination, a semiconductive device having an emitter region, a base region, and a collector region, conducting electrodes attached respectively to each of said regions constituting an emitter electrode, a base electrode and a collector electrode, said base electrode encircling said emitter electrode and being positioned substantially in line with the path of minority current carriers emitted by said emitter region as they travel to said collector region, a source of bias voltage connected to said emitter electrode, and a source of bias voltage connected to said collector electrode, said collector bias voltage being of a magnitude sufficient to cause a multiplication of current carriers in the vicinity of said collector region.

4. In combination, a semiconductive device having an emitter region, a base region, and a collector region, conducting electrodes attached respectively to each of said regions constituting an emitter electrode, a base electrode and a collector electrode, biasing means connected to said emitter electrode, and biasing means connected to said collector electrode, the magnitude of the bias voltage applied to said collector electrode lying in the range of about .1 $V_A$ to substantially $V_A$ where $V_A$ is the avalanche breakdown voltage of said device whereby a multiplication of current carriers occurs at said collector region, said base electrode being physically positioned substantially in line with the path traversed by minority current carriers leaving said emitter region and traveling to said collector region whereby multiplied majority carriers are forced to flow to said base electrode over substantially the same path traversed by said minority carriers but in the opposite direction to impose a substantial drift velocity on the flow of current carriers from said emitter region to said collector region.

5. In combination, a semiconductive device having an emitter region, a base region, and a collector region, conducting electrodes respectively attached to each of said regions constituting an emitter electrode, a base electrode, and a collector electrode, a source of bias voltage connected between said collector electrode and said base electrode, said collector bias voltage being of a magnitude operative to cause a multiplication of current carriers in the vicinity of the junction between said collector region and said base region, and means including said base electrode for forcing a substantial number of said multiplied carriers to flow across said base region over substantially the same path traversed by minority carriers in traveling from said emitter region to said collector region but in a substantially opposite direction thereby creating an electrostatic potential gradient which imposes a substantial drift velocity upon the random diffusion motion of said minority carriers injected into said base region while said injected carriers traverse said base region from said emitter region to said collector region.

References Cited in the file of this patent

UNITED STATES PATENTS

| | | |
|---|---|---|
| 2,563,503 | Wallace | Aug. 7, 1951 |
| 2,646,609 | Heins | July 28, 1953 |
| 2,717,343 | Hall | Sept. 6, 1955 |
| 2,753,496 | Teszner | July 3, 1956 |
| 2,754,431 | Johnson | July 10, 1956 |
| 2,790,034 | McAfee | Apr. 23, 1957 |
| 2,792,539 | Lehovec | May 14, 1957 |
| 2,862,115 | Ross | Nov. 25, 1958 |

FOREIGN PATENTS

| | | |
|---|---|---|
| 739,294 | Great Britain | Oct. 26, 1955 |
| 1,080,034 | France | Dec. 6, 1954 |

OTHER REFERENCES

"Voltage Punch-Through and Avalanche Breakdown and Their Effect on the Maximum Operating Voltages for Junction Transistors," by Hans Schenkel and Hermann Statz, National Electronics Conference Paper, vol. X, pages 614–625. Read October 4–6, 1954, published February 8, 1955.